United States Patent [19]
Mishkin et al.

[11] 3,820,250
[45] June 28, 1974

[54] FREEZE-DRYING PROCESS

[75] Inventors: Abraham Rudolph Mishkin, Chappaqua, N.Y.; James Leroy Anderson, Marysville, Ohio

[73] Assignee: Societe D'Assitance Technique Pour Produits Nestle S.A., Lausanne, Switzerland

[22] Filed: Sept. 28, 1970

[21] Appl. No.: 76,028

[52] U.S. Cl............................ 34/5, 99/71, 34/92
[51] Int. Cl.......... F26b 5/06, A23f 1/08, A23f 3/00
[58] Field of Search....... 34/5, 15, 92; 99/71, 199 C

[56] References Cited
UNITED STATES PATENTS

| | | | |
|---|---|---|---|
| 3,309,779 | 3/1967 | Ginnette et al. | 34/5 |
| 3,384,979 | 5/1968 | Laine et al. | 34/92 |
| 3,465,452 | 9/1969 | Rothmayr | 34/5 X |
| 3,533,805 | 10/1970 | Nava et al. | 99/199 X |
| 3,619,204 | 11/1971 | Katz | 34/5 |

FOREIGN PATENTS OR APPLICATIONS

| | | | |
|---|---|---|---|
| 1,102,587 | 2/1968 | Great Britain | 99/71 |

*Primary Examiner*—William F. O'Dea
*Assistant Examiner*—William C. Anderson
*Attorney, Agent, or Firm*—Watson Leavenworth Kelton & Taggart

[57] ABSTRACT

Tea or coffee extracts are cooled and frozen under reduced pressure prior to freeze-drying. Other features of the invention appear in the following specification and drawings.

5 Claims, 1 Drawing Figure

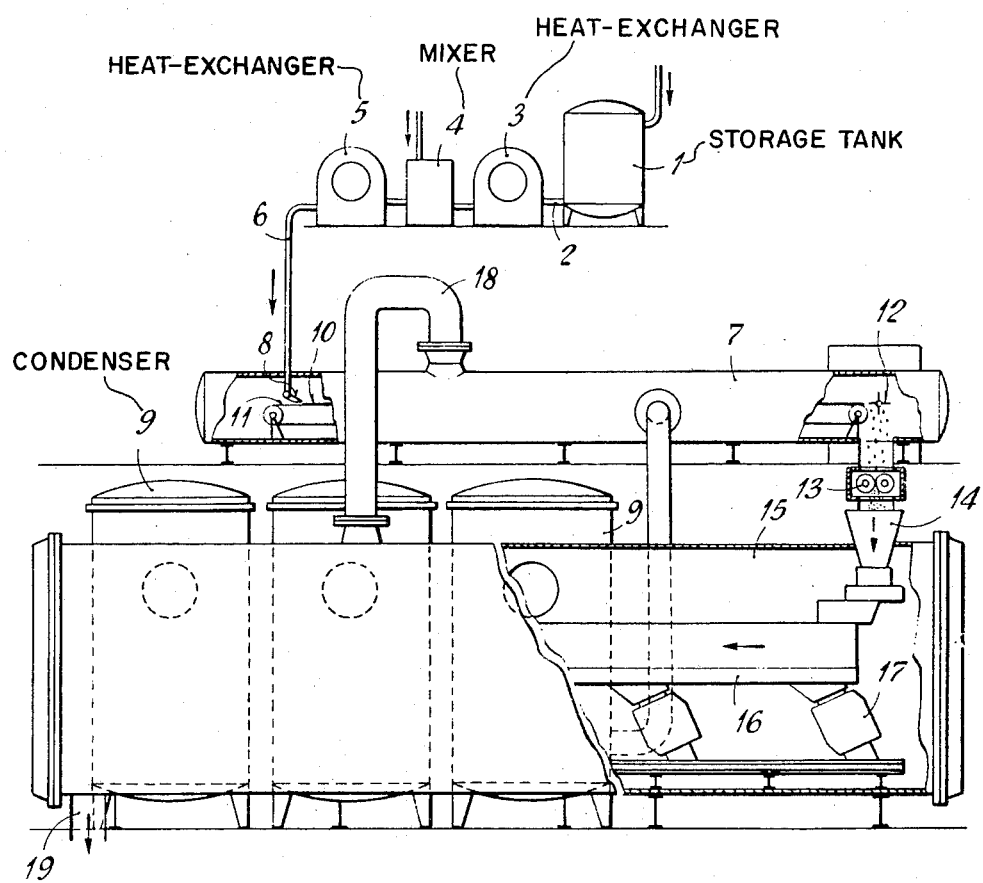

FREEZE-DRYING PROCESS

The present invention relates to the production of soluble extracts from vegetable materials, especially freeze-dried coffee and tea extracts.

Production of these products generally comprises the principal operations of aqueous extraction of the vegetable material, freezing of the resulting aqueous extract and freeze-drying. In order to obtain the dry extract in particulate form, a grinding step is also included, which may be carried out either on the frozen material or on the dried product.

The density and appearance of the dry product are important, especially so for freeze-dried coffee extract. In practice, the density of the product needs to be retained within certain well-defined limits, such as 0.2 – 0.3 g/cc for coffee and 0.08 – 0.12 g/cc for tea, as the consumer is accustomed to applying a rule of thumb whereby one spoonful of extract approximately corresponds to a cup of reconstituted beverage, be it tea or coffee.

The desired density may be achieved in simple manner by freeze-drying an extract of appropriate solids concentration. For coffee, this concentrations will be about 27 – 30 percent, whereas for tea the range is around 9 – 14 percent. However, the freeze-drying of extracts having relatively low solids concentration is rather uneconomical, on account of the large amount of water which needs to be removed per unit weight of solids. These economic disadvantages may be overcome by first converting the extract, containing up to 60 percent of solids, into a foam which after freeze-drying provides a dry product having the desired density.

Irrespective of whether a foam is formed or not, the extract needs to be frozen, batchwise or continuously, in a refrigerated chamber where the temperature is maintained below the melting temperature of the frozen extract, which is −30°C or below. It is clear that in production on an industrial scale, the operation of such chambers necessarily involves a substantial consumption of energy for refrigeration, and the chambers themselves also require a considerable amount of space.

An object of the present invention is to provide a continuous method of freezing tea and coffee extracts prior to freeze-drying which does not require extensive refrigeration facilities.

Another object of the invention is to provide compact means for freezing extracts of high solids contents to provide frozen material having low density.

A further object of the invention is to provide a method of improving the freeze-drying performance of coffee and tea extracts.

It has been found, in accordance with the present invention, that the freeze-drying of coffee and tea extracts, especially in continuous units, can be substantially improved if the frozen material fed to the drier has a certain specific structure. It has been observed that, as in a continuous freeze-drier, the residence time of the product is very short, of the order of minutes, sublimation of the ice has to be rapid. The drying process is essentially controlled by the heat input and the vacuum drawn on the system, increase of the heat input and reduction of the pressure providing for a shorter drying time. However, practical limitations impose a lower limit on the pressure, which is about 50 microns of mercury, whereas excessive heat input causes both scorching of dried product and melting of frozen material. In addition, the particles are in constant motion which can cause increased production of very fine material by attrition. In accordance with the invention, the drying rate may be increased by providing a porous structure in the frozen particles. In practice, this desirable structure is secured by expanding the extract during freezing under specific conditions, and the degree of expansion will be chosen having regard to the solids content of the extract. Surprisingly, despite the porous structure the particles are hard and more resistant to attrition.

Stated broadly, the process of this invention comprises cooling an aqueous tea or coffee extract to a temperature between about 5°C and its freezing point, and subjecting the cooled extract to a reduced pressure whereby it is expanded and frozen to a solid. The frozen solid may be subdivided to any desired particle size and the subdivided material may then be directly freeze-dried, preferably in a continuous unit.

It should be observed that cooling of the extract prior to its being subjected to reduced pressure is an essential feature of the process, as this cooling step has a considerable influence on the structure of the frozen material. In a preferred embodiment of the process the cooling is effected in two stages, as described fully hereafter. The advantages of the process described herein may be obtained by using extracts having solids contents of at least 30 percent by weight, for example, in the range of around 35 to 50 percent by weight, it being preferred to use extracts containing about 38 to 42 percent solids.

An apparatus for carrying out the process defined above is also provided, comprising means for cooling the extract, a gas-tight freezing chamber, a movable support for the product within the chamber, means for supplying cooled extract to the support at one end thereof, subdividing means located adjacent the other end of the support for subdividing frozen extract, means for removing subdivided extract from the chamber and means for maintaining a reduced pressure within the chamber. Preferably, the apparatus is connected directly to a freeze-drying unit, so that the frozen product may be dried immediately after being subdivided.

By way of example, the single FIGURE of the accompanying drawing is a side view, partially in section, of a combined freezing and freeze-drying system comprising interconnected freezing and drying chambers.

Referring to the drawing, an aqueous coffee or tea extract, obtained by percolation and concentrated by evaporation or freeze-concentration to a solids content preferably in the range 38 to 42 percent is stored in tank 1. Extract is withdrawn from the tank by line 2 and is precooled in a heat exchanger 3, such as a "Votator," to a temperature which is preferably below 5°C, for example between about +5° and −4°C. In order to secure a structure within the product which is particularly adapted to continuous freeze-drying, a gas is mixed into the precooled extract in mixer 4. The gas, which should desirably be inert with respect to the extract, may for example be air, carbon dioxide, nitrogen or nitrous oxide. As the quantity of gas added affects the structure of the product, it should be accurately metered and distributed homogeneously throughout the cooled extract. Depending on the solids content of the extract, the amount of gas added will in general correspond to 0.4 to 0.8 standard litres per kg of coffee solids. Tea extracts, it has been found, require a somewhat greater amount of gas, usually between about 1.0 and 1.5 standard litres per kg of solids. After gas injection, the extract is further cooled, preferably to a temperature of −4° to −12°C in a second heat-exchanger 5. The actual temperature will be selected having regard to the solids content of the extract, the lower temperatures being preferred with lower concentrations, and vice-versa.

Cooling of the extract is preferably carried out under conditions such that a portion of the water present in the extract is frozen. By thus providing a certain amount of ice crystals in the cooled extract, expansion and freezing of the extract under reduced pressure proceed smoothly.

After the second cooling step, the extract, desirably containing ice crystals, is passed through line 6 into the freezing chamber 7 where it exits through a flat nozzle 8. The pressure in the chamber 7 should be sufficiently low to cause expansion and freezing of the extract, that is usually below 500 microns of mercury, and is preferably between about 100 and 200 microns. The reduced pressure within the freezing chamber is essentially maintained by condensers 9, but pumps (not shown) are also provided for the evacuation of non-condensables. A refrigeration unit of suitable capacity is also provided for cooling the refrigerant in the condensers to a temperature of −30° to −50°C.

The extract issues from the nozzle 8 under positive pressure, in the form of a ribbon 10. Immediately on leaving the nozzle the ribbon of extract expands and freezes, and it is deposited on the conveyor 11. The thickness of the extract layer, after expansion, is usually between 2 and 4 cm. When it is introduced into the freezing chamber, the extract is subjected to a considerable drop in temperature, caused by rapid evaporation, which favours supercooling which may cause insufficient crystallisation of ice. Supercooling effects are avoided by the prior cooling of the extract, and furthermore homogeneous crystallisation may be promoted by seeding with fine ice crystals or frozen extract particles. It is also possible to warm the extract slightly after it has been introduced into the freezing chamber, for example, by providing a source of heat such as an infra-red lamp adjacent the nozzle 8.

The conveyor 11 may be an endless belt, and it advances the extract through the chamber whilst it freezes. The conveyor speed is adjusted to provide a sufficient residence time for the extract to ensure that it is completely frozen by the time it reaches the end of the run. The residence time, in turn, will be dependent on the thickness of the ribbon which is controlled by the rate of supply of the extract. On reaching the end of the conveyor distant from the nozzle the frozen expanded ribbon of extract is broken up by a breaker 12 and the broken fragments are ground in the mill 13 which is set to provide particles between 0.25 and 2 mm in size. The material from the mill may optionally be screened and it is fed, through air-lock 14 into a continuous freeze-drying chamber 15.

It has been found that after cooling of the extract prior to freezing under reduced pressure, the extract easily freezes to a hard solid which may be subdivided without excessive production of fines, so that screening prior to feeding the extract to the drier is unnecessary. This effect is especially noticeable when small ice crystals are present in the cooled extract. The particles obtained after subdivision remain hard and compact so that few fines are produced by attrition during drying.

Within the chamber 15, the frozen, ground extract is deposited on one end of a tray 16. The tray is vibrated by vibrators 17 at appropriate amplitude and frequency to advance the product along the tray whilst simultaneously changing its orientation. Chamber 15 is maintained at reduced pressure, for example, 200 microns or below, by the condensers 9 and pumps (not shown) for non-condensables. The pressure reducing means are common to both the freezing and the drying chambers, and a pressure equalisation line 18 is provided between the chambers. During its advance along the tray 16, heat is supplied to the product so that the water present as ice is completely sublimed by the time the particles reach the end of the tray. The dry product is collected in the air-lock 19 and is ready for packing.

The following Examples, in which all parts are by weight, are given by way of illustration only.

EXAMPLE 1

An aqueous extract of roasted coffee containing about 18 percent solids, prepared by percolation, is freeze-concentrated to a solids content of 40 percent. The concentrated extract is cooled to a temperature of 0° to 5°C in a heat exchanger and carbon dioxide is then injected into the extract, using a mixer, at a rate of 0.6 litres per kg of solids present in the extract.

After injection of gas, the extract is further cooled to a temperature between −5° and −10°C in a stirred heat exchanger in order to promote formation of ice crystals. The cooled extract is then fed into a freezing chamber where the pressure is maintained at around 150 microns of mercury. The extract is distributed through a flat nozzle at a rate of about 4 kg per minute on a moving conveyor belt.

Immediately on leaving the nozzle the extract expands under the effect of the low pressure. Final volume is reached after advancing about 0.5 m, and by the time it reaches the end of the belt, after about 3 minutes, the extract is frozen to a hard, solid mass. It is then ground to an average particle size between 0.25 and 2 mm.

The frozen particles are then deposited on the tray of a continuous freeze-drier located below the freezing chamber, where the product is dried within 5 minutes. The dried product resembles ground roasted coffee and has a density of 0.25 g/cc.

If no continuous freeze-drier is available, the frozen, subdivided product may be removed from the freezing chamber through an air-lock for drying in a batch unit.

EXAMPLE 2

The basic procedure described in Example 1 is repeated with a coffee extract containing 45 percent solids, which has been concentrated by evaporation. In this case, however, after addition of gas (nitrogen) the extract is cooled to a temperature between −4° and −7°C. It is then fed to the nozzle at a rate of about 2.3 kg per minute. The residence time in the freezing chamber is about 6 minutes, and the product is dried in a continuous freeze-drier.

The dry material shows no sign of scorching or melting, and reconstitutes easily with water to provide a coffee beverage having excellent flavour.

EXAMPLE 3

An aqueous extract of black tea containing about 2.5 percent solids is prepared by percolation and is then concentrated to a solids content of 40 percent. The concentrated extract is cooled to 5°C and nitrous oxide is added at a rate of 1.25 litres per kg of extract solids. The gas is homogeneously distributed throughout the extract using a mixer.

The gassed, concentrated extract is then cooled to a temperature between 0° and −4°C in a stirred heat exchanger and is frozen and dried as described in Example 1.

The dried product, which has a density of about 0.10 g/cc, shows no signs of melting or scorching and reconstitutes with water to provide an excellent tea beverage.

We claim:

1. A process for preparing freeze-dried tea extract which comprises subjecting an aqueous tea extract containing about 35 to 50 percent by weight of solids to the steps comprising:
   a. cooling the extract to a temperature between about +5° and −4°C,
   b. mixing a gas inert with respect to the extract in an amount between about 1.0 to 1.5 standard litres per kg of tea solids with and distributing same homogeneously throughout the cooled extract,
   c. further cooling the extract to a temperature between about −4° and −12°C and until ice crystals are formed therein,
   d. extruding a ribbon of the cooled ice-containing extract into a zone of reduced pressure not exceeding 500 microns to immediately expand and freeze said extract within said zone, and
   e. comminuting and freeze-drying the frozen extract.

2. A process for preparing freeze-dried tea extract which comprises subjecting an aqueous tea extract containing about 40 percent by weight of solids to the steps comprising:
   a. cooling the extract to a temperature of about +5°C,
   b. mixing a gas inert with respect to the extract in an amount between about 1.0 and 1.5 standard litres per kg of tea solids with and distributing same homogeneously throughout the cooled extract,
   c. further cooling the extract to a temperature between about 0° and −4°C and until ice crystals are formed therein,
   d. extruding a ribbon of the cooled ice-containing extract into a zone of reduced pressure not exceeding 500 microns to immediately expand and freeze said extract within said zone, and
   e. comminuting and freeze-drying the frozen extract.

3. A process for preparing freeze-dried coffee extract which comprises subjecting an aqueous coffee extract containing about 35 to 50 percent by weight of solids to the steps comprising:
   a. cooling the extract to a temperature between about +5° and −4°C,
   b. mixing a gas inert with respect to the extract in an amount between about 0.4 to 0.8 standard litres per kg of coffee solids with and distributing same homogeneously throughout the cooled extract,
   c. further cooling the extract to a temperature between about −4° and −12°C and until ice crystals are formed therein,
   d. extruding a ribbon of the cooled ice-containing extract into a zone of reduced pressure not exceeding 500 microns to immediately expand and freeze said extract within said zone, and
   e. comminuting and freeze-drying the frozen extract.

4. A process for preparing freeze-dried coffee extract which comprises subjecting an aqueous coffee extract containing about 40 percent by weight of solids to the steps comprising:
   a. cooling the extract to a temperature between about +5°C and 0°,
   b. mixing a gas inert with respect to the extract in an amount between about 0.4 and 0.8 standard litres per kg of coffee solids with and distributing same homogeneously throughout the cooled extract,
   c. further cooling the extract to a temperature between about −5° and −10°C and until ice crystals are formed therein,
   d. extruding a ribbon of the cooled ice-containing extract into a zone of reduced pressure not exceeding 500 microns to immediately expand and freeze said extract within said zone, and
   e. comminuting and freeze-drying the frozen extract.

5. A process for preparing freeze-dried coffee extract which comprises subjecting an aqueous coffee extract containing about 45 percent by weight of solids to the steps comprising:
   a. cooling the extract to a temperature between about +5°C and 0°,
   b. mixing a gas inert with respect to the extract in an amount between about 0.4 to 0.8 standard litres per kg of coffee solids with and distributing same homogeneously throughout the cooled extract,
   c. further cooling the extract to a temperature between about −4° and −7°C and until ice crystals are formed therein,
   d. extruding a ribbon of the cooled ice-containing extract into a zone of reduced pressure not exceeding 500 microns to immediately expand and freeze said extract within said zone, and
   e. comminuting and freeze-drying the frozen extract.

* * * * *